US010325506B2

(12) United States Patent
Goddemeier et al.

(10) Patent No.: US 10,325,506 B2
(45) Date of Patent: Jun. 18, 2019

(54) METHOD FOR MONITORING AIRSPACE

(71) Applicant: TECHNISCHE UNIVERSITÄT DORTMUND, Dortmund (DE)

(72) Inventors: Niklas Goddemeier, Witten (DE); Sebastian Rohde, Bochum (DE); Christian Wietfeld, Dortmund (DE)

(73) Assignee: TECHNISCHE UNIVERSITÄT DORTMUND, Dortmund (DE)

( * ) Notice: Subject to any disclaimer, the term of this patent is extended or adjusted under 35 U.S.C. 154(b) by 37 days.

(21) Appl. No.: 15/303,104

(22) PCT Filed: Apr. 8, 2015

(86) PCT No.: PCT/EP2015/057599
§ 371 (c)(1),
(2) Date: Oct. 10, 2016

(87) PCT Pub. No.: WO2015/155226
PCT Pub. Date: Oct. 15, 2015

(65) Prior Publication Data

US 2017/0025023 A1 Jan. 26, 2017

(30) Foreign Application Priority Data

Apr. 8, 2014 (DE) ........................ 10 2014 105 001

(51) Int. Cl.
*G01S 13/00* (2006.01)
*G01S 13/74* (2006.01)
(Continued)

(52) U.S. Cl.
CPC ......... *G08G 5/0095* (2013.01); *G08G 5/0013* (2013.01); *G08G 5/0026* (2013.01); *G08G 5/0082* (2013.01)

(58) Field of Classification Search
CPC .. G08G 5/0013; G08G 5/0026; G08G 5/0082; G08G 5/0095
See application file for complete search history.

(56) References Cited

U.S. PATENT DOCUMENTS 5,786,773 A * 7/1998 Murphy .................. G01S 19/07 340/947
2002/0075179 A1* 6/2002 Hudson ................. G01S 13/765 342/30

(Continued)

FOREIGN PATENT DOCUMENTS

| | | | |
|---|---|---|---|
| DE | 102005031439 | A1 | 1/2007 |
| EP | 2056272 | A2 | 5/2009 |
| WO | 2009112112 | A1 | 9/2009 |

OTHER PUBLICATIONS

International Search Report & Written Opinion dated Jul. 16, 2015 from corresponding International PCT Application No. PCT/EP2015/057599, 12 pages.

*Primary Examiner* — Adam D Tissot
(74) *Attorney, Agent, or Firm* — Innovation Capital Law Group, LLP; Vic Lin

(57) ABSTRACT

A method for monitoring an airspace includes a first control and detection system and a second control and detection system. The first control and detection system has a first flying device and a first control and detection unit, and the second control and detection system has a second flying device and a second control and detection unit. An airspace monitoring system is different from the first control and detection unit and also from the second control and detection unit. First data relating to the first flying device is transmitted from the first control and detection unit to the airspace monitoring system, and data based on the first data is transmitted from the airspace monitoring system to the second control and detection unit. In this manner, the
(Continued)

method allows a system-independent airspace monitoring process.

8 Claims, 11 Drawing Sheets

(51) Int. Cl.
*G01S 13/78* (2006.01)
*G01S 13/91* (2006.01)
*G08G 5/00* (2006.01)

(56) References Cited

U.S. PATENT DOCUMENTS

2009/0248287 A1 10/2009 Limbaugh et al.
2009/0322588 A1 12/2009 Rolfe et al.

* cited by examiner

METHOD FOR MONITORING AIRSPACE

BACKGROUND OF THE INVENTION

The invention relates to a method for monitoring airspace, in particular to a method for identifying and locating aircraft in order to prevent collisions between aircraft.

Different systems are known for preventing collisions between manned aircraft. Known systems of this kind generally provide an on-board electronics system, comprising a computer having a screen, a data communications device, a FLARM (FLight alARM) and/or ADS-B (Automatic Dependent Surveillance-Broadcast) receiver, a transponder, a GNSS (Global Navigation Satellite System) device and an electronic control unit for processing data, in the respective aircraft. An aircraft receives the flight data of another aircraft via this on-board electronics system. The data which is received by the on-board electronics system is processed and graphically displayed to the pilot on the screen of the computer. In this way, the pilot can decide which measures should be initiated in order to prevent a collision with the other aircraft. However, data interchange of this kind requires both aircraft to have the same communications technology, so that the respectively sent and received flight data can also be read and processed.

Furthermore, DE 10 2007 032 084 A1 discloses a collision and conflict prevention system for autonomous unmanned aircraft (UAV—Unmanned Aerial Vehicle), in which the system uses available on-board sensors in order to create an image of the surrounding airspace. In this way, the airspace is surveyed for potential conflicts and, if a problem is encountered, a search for possible avoidance measures is started, wherein the avoidance routes correspond, as far as possible, to the prescribed rules of the air.

The known conflict prevention systems are accordingly arranged in the respective aircraft as on-board electronics systems. An on-board electronics system of this kind comprising a conflict prevention system may be too heavy for relatively small and/or lightweight manned or unmanned aircraft on account of the weight. A further problem is that not all aircraft have standardized communications technology and a transmitter for sending data and a receiver for receiving data. Aircraft comprising different communication and location systems therefore have the problem that they may not be able to recognize or identify all aircraft.

SUMMARY OF THE INVENTION

It is therefore the object of the invention to provide a method for monitoring airspace which allows cross-system airspace monitoring.

This object is achieved by the subject matter of patent claim 1. Preferred developments are specified in the dependent claims.

Therefore, a method for monitoring airspace is provided according to the invention, said method having a first control and detection system and a second control and detection system, wherein the first control and detection system has a first aircraft and a first control and detection unit, and the second control and detection system has a second aircraft and a second control and detection unit, characterized in that an airspace monitoring system which is different from the first control and detection unit and also from the second control and detection unit is provided, first data relating to the first aircraft is transmitted to the airspace monitoring system by the first control and detection unit, and data which is based on the first data is sent to the second control and detection unit by the airspace monitoring system, and the data is transmitted to the second aircraft by the second control and detection unit.

Therefore, an essential aspect of the invention is that the first data relating to the first aircraft is transmitted to the airspace monitoring system by the first control and detection unit, and data which is based on the first data is sent to the second control and detection unit by the airspace monitoring system. In this way, the first data is transmitted to the second aircraft by the first aircraft by means of the airspace monitoring system and the second control and detection unit.

The first aircraft and/or the second aircraft are/is an unmanned aircraft or a manned aircraft. Unmanned aircraft are preferably to be understood to be drones. Manned aircraft include both lightweight sports airplanes, gliders, parachutists and also relatively large passenger and cargo airplanes.

The first control and detection unit and/or the second control and detection unit are/is preferably a ground station which has a continuous connection with the first aircraft and, respectively, the second aircraft.

The first control and detection unit and/or the second control and detection unit are/is particularly preferably a secondary radar system comprising a secondary radar transmitter and a secondary radar receiver, wherein the secondary radar receiver receives data which is sent by the aircraft and the transmitter sends data to the aircraft. The first control and detection unit and/or the second control and detection unit are/is very particularly preferably a primary radar system comprising a tracking system and a transmitter, wherein the tracking system gathers data of the aircraft and the transmitter sends data to the aircraft.

The first data is preferably data about the flight speed, the position, the altitude, the climb and/or descent rate, the distance and also the flight direction of the respective first aircraft. The first data is preferably signals. The first data is particularly preferably data structures for describing the airspace, on the basis of which data structures a flight area can be reserved. The first data is very particularly preferably computer-readable data, wherein the first data of the first aircraft can have different file formats. The file formats of the first data are preferably data from the FLARM or the ADS-B.

A further preferred development of the invention provides that a time stamp and/or a tracking ID is added to the first data and/or to the data. The time stamp makes it possible to check that the first data and/or the data are up-to-date. The tracking ID ensures that the data which is sent by the airspace monitoring system can be unambiguously assigned to the first data which is transmitted to the airspace monitoring system even at a later time. A traceable data profile in the airspace monitoring system is ensured in this way.

The speed of the data transmission can be of central importance, in particular, in order to prevent a collision between the first aircraft and the second aircraft. Therefore, a preferred development of the invention provides that the transmission of the first data by the first control and detection unit to the airspace monitoring system and sending of the data, which is based on the first data, by the airspace monitoring system to the second control and detection unit are transmitted and, respectively, sent virtually in real time and therefore immediately, without planned delays. This creates the possibility of providing data about the first aircraft directly to a second aircraft, in order to spot a collision between the first aircraft and the second aircraft in good time and to prevent said collision. The data communication between the first control and detection unit and the airspace monitoring system and, respectively, the airspace monitoring system and the second control and detection unit is preferably based on a web-based communication technology. Rapid and direct data communication is made possible in this way.

A further preferred development of the invention provides that the first data which is transmitted to the airspace monitoring system and/or the data which is sent to the second control and detection unit by the airspace monitoring system is transformed in the airspace monitoring system. During transformation of the first data which is transmitted to the airspace monitoring system, the first data is transformed into a file format that allows the first data to be processed in the airspace monitoring system. By transformation of the data which is sent by the airspace monitoring system, the data can first be transformed into the original file format of the first data and/or into a file format which is different from the first data. If the data is transformed into a file format which is different from the first data, the data which is based on the first data can be sent to a second control and detection unit which is different from the first control and detection unit. In this way, the first data of the first aircraft can be transmitted to a second aircraft the airspace monitoring system and the second control and detection unit by means of the first control and detection unit in a cross-system manner. The second aircraft can therefore read the first data of the first aircraft without having to have the corresponding communications technology of the first aircraft for this purpose. In addition to a positive effect on the weight of the second aircraft, costs can therefore additionally be reduced since each second aircraft does not have to have technology for transforming the data.

In order that the first data which is transmitted to the airspace monitoring system and/or the data which is sent by the airspace monitoring system can still be inspected and traced at a later time, a further preferred development of the invention is that the first data which is transmitted to the airspace monitoring system and/or the data which is sent to the second control and detection unit by the airspace monitoring system is stored in the airspace monitoring system. In this way, the flight route of the first aircraft can be documented. If the first aircraft is an unmanned aircraft, the storage and documentation of the first data or data can additionally meet the legislative requirements in respect of maintaining a logbook.

According to a further preferred development of the invention, it is provided that the first aircraft is identified by the airspace monitoring system. In this way, the first data can be assigned to a specific first aircraft. To this end, the first aircraft preferably has a machine-readable identifier which, amongst other things, permits conclusions to be drawn about the operator of the first aircraft. The machine-readable identifier is particularly preferably a chip card which is integrated into the first aircraft, a SIM card or else a QR code. In conjunction with the storage of the first data, further requirements in respect of maintaining the logbook for the unmanned aircraft can additionally be met in this way since the first data can be allocated to the first aircraft.

Strict safety requirements are placed on the transmission of data in the aviation sector, so that said data is not misused by unauthorized persons. A preferred development of the invention therefore provides that the first data which is transmitted to the airspace monitoring system and/or the data which is sent to the second control and detection unit by the airspace monitoring system is encrypted. Misuse of the first data which is transmitted to the airspace monitoring system and/or of the data which is sent by the airspace monitoring system can be reduced in this way.

In order to increase safety when transmitting data in the aviation sector and in particular for legally secure assignment of the first data which is transmitted to the airspace monitoring system, an advantageous development of the invention is that the first data which is transmitted to the airspace monitoring system and/or the data which is sent to the second control and detection unit by the airspace monitoring system is digitally signed. It is possible to draw conclusions about the operator of the aircraft, and therefore legally secure assignment of the first data of the first aircraft, which first data is transmitted to the airspace monitoring system, is possible, in this way. The digital signature of the first data is preferably made with a private key of the operator of the first aircraft. The first data is particularly preferably digitally signed by the first control and detection unit in respect of the first aircraft. The first data is very particularly preferably signed by the airspace monitoring system with a private key which is assigned to the first aircraft.

An advantageous development of the invention provides that, after the signature, preferably the operator and/or device signature, is checked, the first data is signed by the airspace monitoring system with a private key which is assigned to the airspace monitoring system itself. A plurality of first data items are preferably combined for this purpose in order to allow efficient data processing.

In this connection, a preferred development of the invention provides that the digital signature is made using a private key which is introduced into the airspace monitoring system in a personal and/or device-related manner by a copy-protected, cryptographic token. The token preferably meets the requirements for the qualified digital signature. The personal signature is particularly preferably made by means of the electrical identification.

Furthermore, a further preferred development of the invention provides that, based on the first data, a region of the airspace on the flight route of the first aircraft in the airspace monitoring system is reserved for the first aircraft for a period of time. In this way, the airspace monitoring system contains data of the flight route of the first aircraft, wherein this data is transmitted to the second control and detection unit. In this way, the second aircraft is reserved by means of the region of the airspace which is reserved by the first aircraft, so that the second aircraft can change its flight route if a collision with the first aircraft is expected. A possible collision can therefore be spotted in good time.

In addition to the first data about the flight route of the first aircraft, data of fundamental or temporary no-fly zones can also be stored in the airspace monitoring system. The data of fundamental or temporarily no-fly zones can preferably be called up by means of an authorizing body which is connected to the airspace monitoring system such that they can communicate. A further preferred development of the invention provides that data of a no-fly zone is stored in the airspace monitoring system and the data of the no-fly zone is checked using the first data which is transmitted to the airspace monitoring system. When a risk of collision is ascertained, data is transmitted by the airspace monitoring system to the first aircraft in order to change its flight route. In addition to the data of the no-fly zone, data relating to the proximity of airports and/or data relating to inner-city areas and/or data relating to complying with particular regulatory conditions is preferably stored in the airspace monitoring system and can be called up by means of the authorizing body which is connected to the airspace monitoring system such that they can communicate. In this way, it is possible to check in advance whether the planned flight or the planned flight route corresponds to the respective statutory and/or safety requirements.

According to a further preferred development of the invention, it is provided that, based on the first data for the first aircraft, ascent permission for the first aircraft is applied for and obtained by means of the airspace monitoring system. First data of the first aircraft about the flight route is stored in the airspace monitoring system in this way. In the event of a positive reply and ascent permission, data which is based on the first data is transmitted to the second control and detection unit. This data is not transmitted directly to the second control and detection unit, but rather only at the relevant time, that is to say only from the time at which the first aircraft begins to ascend and therefore there may be a risk of collision with the second aircraft.

A further preferred development of the invention provides that the first aircraft is an unmanned aircraft and the unmanned aircraft has a continuous connection to the first control and detection unit and, when the continuous connection is interrupted, first data relating to the interruption in connection is transmitted to the airspace monitoring system by the first control and detection unit, and data is sent to the second control and detection system by the airspace monitoring system based on the first data relating to the interruption in connection. In this way, the second aircraft is informed about the interruption in connection between the unmanned aircraft and the first control and detection unit, so that the second aircraft can pay increased attention to the air traffic in order to be able to quickly react in the event of an expected collision.

A further preferred development of the invention provides that the first control and detection unit is a constituent part of the second control and detection unit and forms a combined control and detection unit, and the first data is detected and transmitted to the airspace monitoring system by the combined control and detection unit and, based on the first data, data is sent to the combined control and detection unit by the airspace monitoring system. The first control and detection unit preferably differs from the second control and detection unit. In this way, the combined control and detection unit is of cross-system design.

In this connection, a further preferred development of the invention provides that the airspace monitoring system is an integral constituent part of the combined control and detection system. The first control and detection unit, the second control and detection unit and the airspace monitoring system form an integral system in this way.

In order to identify a possible collision between the first aircraft and the second aircraft, a preferred development of the invention provides that second data relating to the second aircraft is transmitted to the airspace monitoring system by the second control and detection unit. The airspace monitoring system checks the first data of the first aircraft and the second data of the second aircraft for a conflict, in particular for a possible collision. When a risk of collision is identified, data is transmitted to the second control and detection system based on the first data and the second data. In this way, the second aircraft is informed about the identified risk of collision with the first aircraft and can change its flight route. Therefore, the second aircraft does not require any technology on board for the purpose of evaluating the first data of the first aircraft, this having a positive effect on the weight of the second aircraft. In addition, the costs of the aircraft can be reduced in this way since the airspace monitoring system evaluates the data and there is no need for technology to be arranged in the first aircraft or in the second aircraft in order to evaluate the flight data.

The second data, like the first data, is preferably data about the flight speed, the position, the altitude, the climb and/or descent rate, the distance and also the flight direction of the respective second aircraft, wherein the file format of the second data can differ from the file format of the first data.

In this connection, a further preferred development of the invention provides that data, which is based on the second data, is sent to the first control and detection unit by the airspace monitoring system. In this way, the first aircraft receives data about the second aircraft. In addition, in the event of a risk of collision between the first aircraft and the second aircraft being identified by the airspace monitoring system, both the first aircraft and also the second aircraft can in this way be informed about the identified risk of collision and can each change their flight route.

A further preferred development of the invention is that the first data and second data which is transmitted to the airspace monitoring system is combined in the airspace monitoring system. In this way, based on this combined data, data can be sent to the first control and detection unit and/or data can be sent to the second control and detection unit in order to prespecify or propose a new flight route to the first aircraft and/or to the second aircraft.

In principle, it should be noted that the second data can be processed in a corresponding manner to the first data in the airspace monitoring system. Therefore, the second data can likewise be stored, transformed, encrypted and/or digitally signed. Identification of the second aircraft by the airspace monitoring system is likewise possible. Furthermore, based on the second data, the airspace for the second aircraft can be reserved in the airspace monitoring system, or ascent permission for the second aircraft can be obtained by means of the airspace monitoring system.

According to a further preferred development of the invention, it is provided that the first control and detection system has a plurality of first aircraft and/or the second control and detection system has a plurality of second aircraft, and the first control and detection unit transmits a plurality of first items of data to the airspace monitoring system. In this way, a large number of first aircraft and, respectively, second aircraft can be connected to the first control and detection unit and, respectively, the second control and detection unit, such that they can communicate, by means of the respective first control and detection unit and, respectively, the second control and detection unit.

Finally, a preferred development of the invention provides that the method comprises a plurality of first control and detection systems and/or a plurality of second control and detection systems. In this way, the airspace can be monitored for a large number of first aircraft and/or second aircraft in a cross-system manner.

BRIEF DESCRIPTION OF THE DRAWINGS

The invention will be explained in greater detail below on the basis of a preferred exemplary embodiment with reference to the drawing, in which.

DETAILED DESCRIPTION OF THE INVENTION

Figure 1:
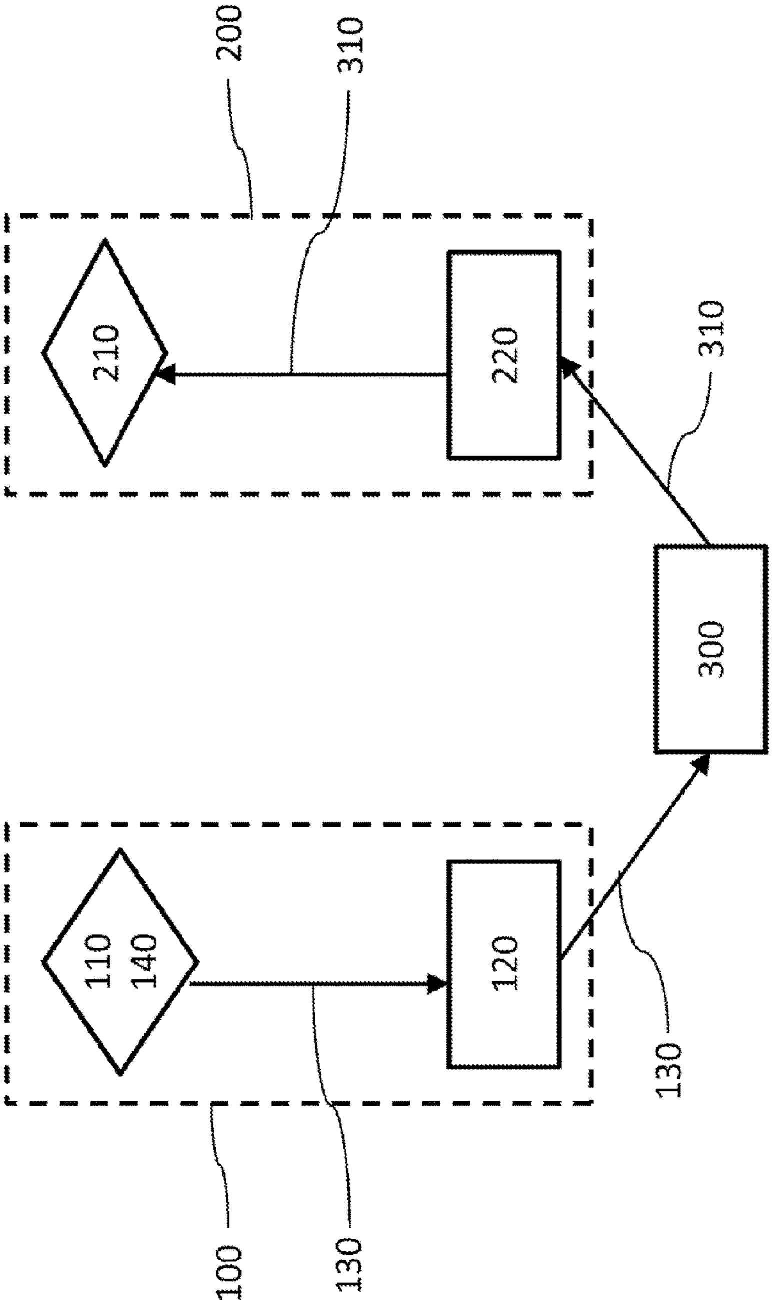
FIG. 1 is a schematic illustration of a method for monitoring airspace, wherein data of a first aircraft is transmitted to a second aircraft, in accordance with the preferred exemplary embodiment of the invention.

FIG. 1 shows a method for monitoring airspace, having a first control and detection system 100, a second control and detection system 200 and an airspace monitoring system 300.

The first control and detection system 100 comprises a first aircraft 110 and a first control and detection unit 120, wherein the first control and detection unit 120 is connected to the first aircraft 110 such that they can communicate. Similarly, the second control and detection system 200 comprises a second aircraft 210 and a second control and detection unit 220, wherein the second control and detection unit 220 is connected to the second aircraft 210 such that they can communicate. The first control and detection system 100 and the second control and detection system 200 are connected to one another, such that they can communicate, by means of the airspace monitoring system 300. To this end, the first control and detection unit 120 and the second control and detection unit 220 are preferably connected to the airspace monitoring system 300 by means of a web-based communications connection.

In the present case, the first aircraft 110 is preferably a manned aircraft and the second aircraft 210 is preferably an unmanned aircraft. In addition, the first control and detection unit 120 is preferably a secondary radar system comprising a secondary radar transmitter and a secondary radar receiver, and the second control and detection unit 220 is preferably a ground station of an unmanned aircraft. Therefore, the first control and detection system 100 and the second control and detection system differ from one another.

For the purpose of monitoring airspace, the first control and detection unit 120 detects first data 130 of the first aircraft 110, wherein this first data 130 is preferably data about the flight speed, the position, the altitude, the climb and/or descent rate, the distance and also the flight direction of the first aircraft 110, and is preferably sent by means of the ADS-B. The first data is accordingly in the ADS-B file format.

The first data is transmitted to the airspace monitoring system 300 by the first control and detection unit. The first data 130 is transformed in the airspace monitoring system 300. Based on this first data 130, data 310 is sent to the second control and detection unit 220 and transmitted to the second aircraft 210 by the second control and detection unit 220. In this way, the first data 130 of the first aircraft 110 can be made readable to the second aircraft 210 owing to the transformation of the first data 130 in the airspace monitoring system 300. In this way, the second aircraft 210 can identify the flight route of the first aircraft 110 and change its own flight route if necessary. Therefore, the airspace can be monitored in a cross-system manner.

Communications technology between the first aircraft 110 and the first control and detection unit 120 is not required in addition to the communications technology between the second aircraft 210 and the second control and detection unit 220 in order to read the first data 130 of the first aircraft 110 in the second aircraft 210. Therefore, no further communications technology is required in addition to the existing communications connection between the second aircraft 210 and the second control and detection unit 220 for the purpose of cross-system monitoring of the airspace, this having a positive effect on the weight of the second aircraft 210.

Furthermore, it is provided that a time stamp is supplied to the first data 130 when said data is transmitted by the first control and detection unit 120. In this way, it is possible to ensure that the first data 130 is up-to-date by virtue of comparing the time stamp with the actual time.

It is likewise provided that the first data 130 which is transmitted to the airspace monitoring system 300 and/or the data 310 which is sent by the airspace monitoring system 300 is stored in the airspace monitoring system 300. In this way, the flight route of the first aircraft 110 can be documented.

In order to meet the strict safety requirements in respect of data transmission in the aviation sector, the first data 130 which is transmitted to the airspace monitoring system 300 and/or the data 310 which is sent to the second control and detection unit 220 by the airspace monitoring system 300 is encrypted. Misuse of the first data 130 which is transmitted to the airspace monitoring system 300 and/or of the data 310 which is sent by the airspace monitoring system 300 by unauthorized persons can be reduced in this way.

In order to be able to assign the first data 130 to a specific first aircraft 110, the first aircraft 110 is identified by the airspace monitoring system 300. To this end, the first aircraft 110 has a machine-readable identifier 140 which, amongst other things, permits conclusions to be drawn about the operator of the first aircraft 110. The machine-readable identifier 140 can preferably be a chip card which is integrated into the first aircraft 110, a SIM card or else a QR code. To this end, it is further provided that the first data 130 contains information of the machine-readable identifier 140, so that the airspace monitoring system 300 can assign the first data 130 to the first aircraft 110.

For the purpose of legally secure assignment of the first data 130 to the first aircraft 110 and, respectively, to the operator of the first aircraft 110, it is additionally provided that the first data 110 which is transmitted to the airspace monitoring system 300 and/or the data 310 which is sent to the second control and detection unit 220 by the airspace monitoring system 300 is digitally signed. It is possible to draw conclusions about the operator of the aircraft 110, and therefore legally secure assignment of the first data 130 of the first aircraft 110, which first data is transmitted to the airspace monitoring system 300, is possible, in this way. The digital signature of the first data 110 is preferably made with a private key of the operator of the first aircraft 110. The first data 130 is particularly preferably digitally signed by the first control and detection unit 120 in respect of the first aircraft 110. The first data is very particularly preferably signed by the airspace monitoring system with a private key which is assigned to the first aircraft. In this case, it is preferably provided that, after the signature is checked, the first data 130 is signed by the airspace monitoring system 300 with a private key which is assigned to the airspace monitoring system 300. A plurality of first data items 130 are combined for this purpose in order to allow efficient data processing.

The present example is not restricted only to the case of the first aircraft 110 being a manned aircraft and the second aircraft 210 being an unmanned aircraft. It is likewise possible for the first aircraft 110 to be an unmanned aircraft and the second aircraft 210 to be a manned aircraft, or for the first aircraft 110 to be an unmanned aircraft and the second aircraft 210 to be an unmanned aircraft.

If the first aircraft 110 is an unmanned aircraft and the first control and detection unit 120 is a ground station, and the second aircraft is a manned aircraft and the second control and detection unit 220 is a secondary radar system, comprising a secondary radar transmitter and a secondary radar receiver, the first data 130 of the first aircraft 110, which data is preferably in the form of computer-readable data, is transmitted to the airspace monitoring system 300 by the ground station 120. The first data 130 is transformed into data of the FLARM and/or ADS-B file format in the airspace monitoring system 300. The airspace monitoring system 300 sends the transformed data 310, which is based on the first data 130, to the second control and detection unit 220. The second control and detection unit 220 transmits the data 310 to the second aircraft in the FLARM and/or ADS-B file format. The second aircraft can therefore identify the flight position and flight route of the first aircraft by means of the transformed data 310.

Figure 2:
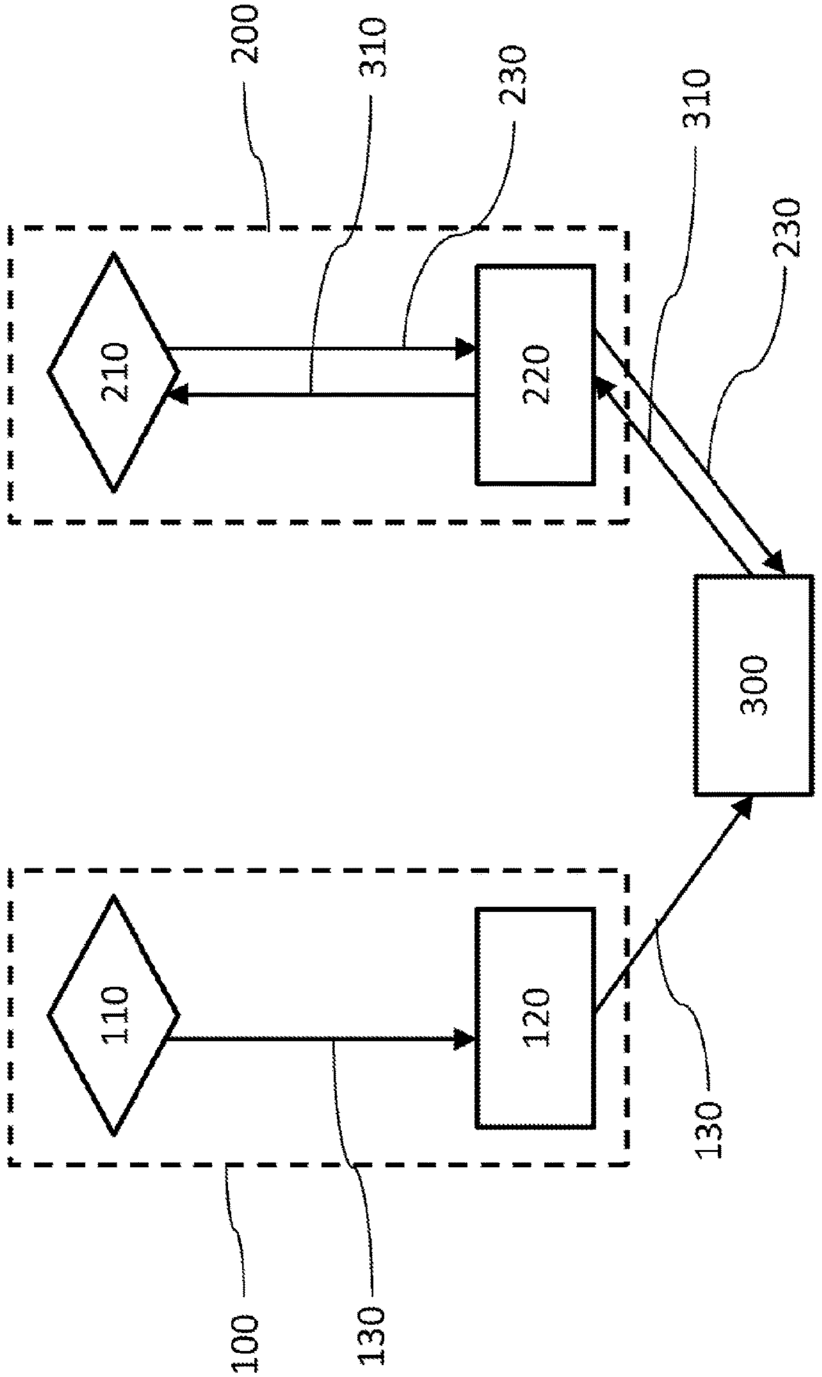
FIG. 2 is a schematic illustration of the method for monitoring airspace, wherein first data of the first aircraft is checked for a collision using second data of the second aircraft in the airspace monitoring system, in accordance with the preferred exemplary embodiment of the invention.

FIG. 2 shows that, in addition to transmission of the first data 130 of the first aircraft 110 to the airspace monitoring system 300 by the first control and detection unit 120, the second control and detection unit 220 transmits second data 230 to the airspace monitoring system 300.

The first data 130 and/or the second data 230 are transformed, combined and checked for a collision within the airspace monitoring system. Based on the first data 130 and the second data 230, data 310 is transmitted to the second control and detection unit 220 and forwarded to the second aircraft 210 by the second control and detection unit 220. Evaluation and checking of the first data 130 and the second data 230 takes place in the airspace monitoring system 300. Therefore, the second aircraft 210 does not require any technology on board in order to evaluate the first data 130 of the first aircraft 110, this having a positive effect on the weight of the second aircraft.

Figure 3:
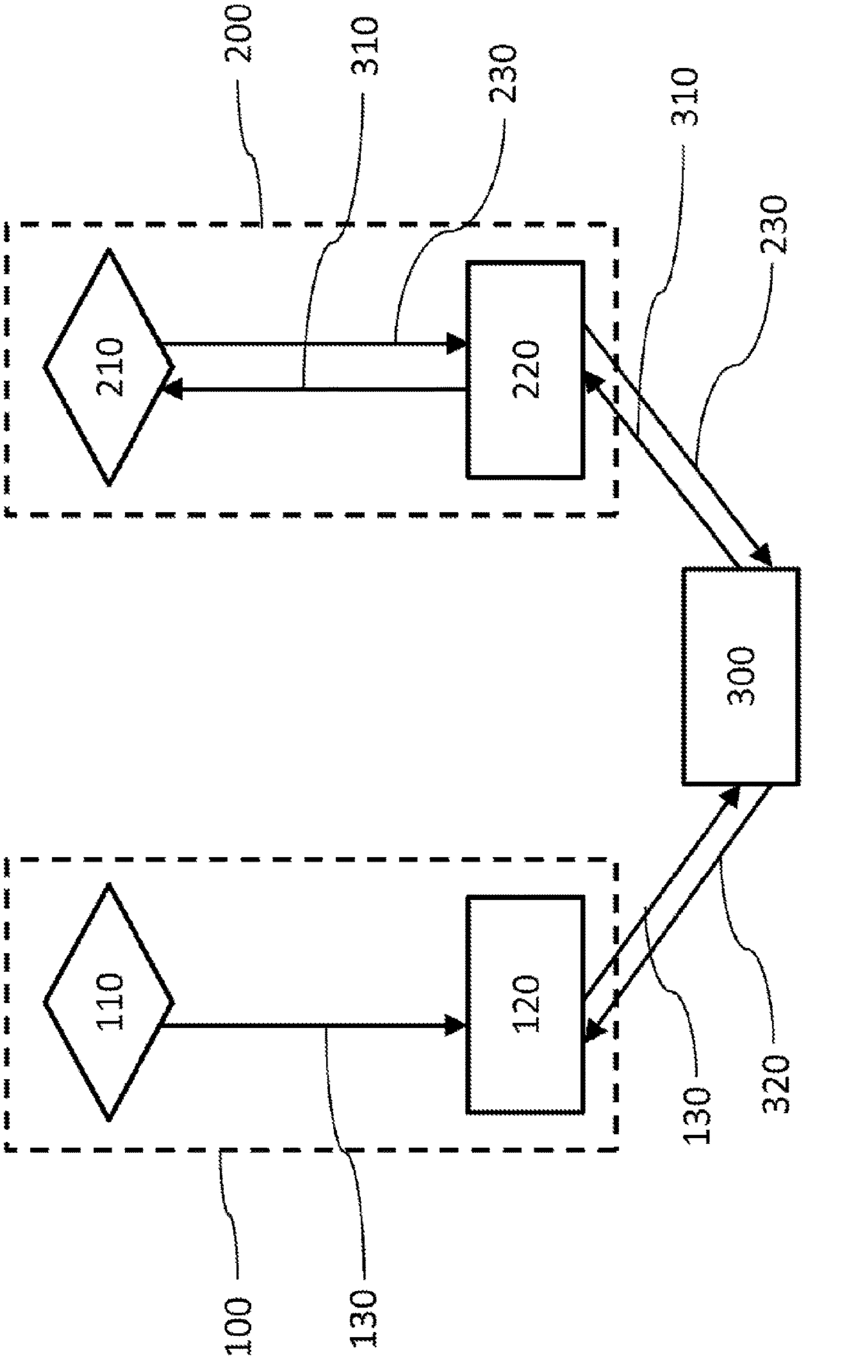
FIG. 3 is a schematic illustration of the method for monitoring airspace, wherein data is sent to the first control and detection unit and to the second control and detection unit by the airspace monitoring system, in accordance with the preferred exemplary embodiment of the invention.

FIG. 3 shows that data 310 is sent to the second control and detection unit 220 by the airspace monitoring system 300, and data 310 is sent to the first control and detection unit 120.

The first data 130 and second data 230 which is transmitted to the airspace monitoring system 300 is transformed in the airspace and checked for a collision. Based on the checking of the first data 130 and the second data 230, data 310 is sent to the first control and detection unit 120 and to the second control and detection unit 220 by the airspace monitoring system 300. In this way, the first aircraft 110 is informed about the position and flight route of the second aircraft 210 and the second aircraft 210 is informed about the position and flight route of the first aircraft 110 in a cross-system manner. In the event of a collision between the first aircraft 110 and the second aircraft 210 being identified, both the first aircraft 110 and also the second aircraft 210 can change their flight route. Since checking for a collision between the first aircraft 110 and the second aircraft is performed in the airspace over system 300, neither the first aircraft 110 nor the second aircraft 210 requires the communications technology of the respective other aircraft.

Figure 4:
FIG. 4 shows a machine-readable identifier in the form of a QR code for identifying the first aircraft and, respectively, the second aircraft, in accordance with the preferred exemplary embodiment of the invention.

FIG. 4 shows the machine-readable identifier 140 in the form of a QR code. In addition to a two-dimensional barcode 150, the machine-readable identifier 140 additionally has an alphanumeric component 160 which provides information about the type of aircraft, contains an indication of origin relating to the country of registration, and has a character string for unambiguous identification.

Figure 5:
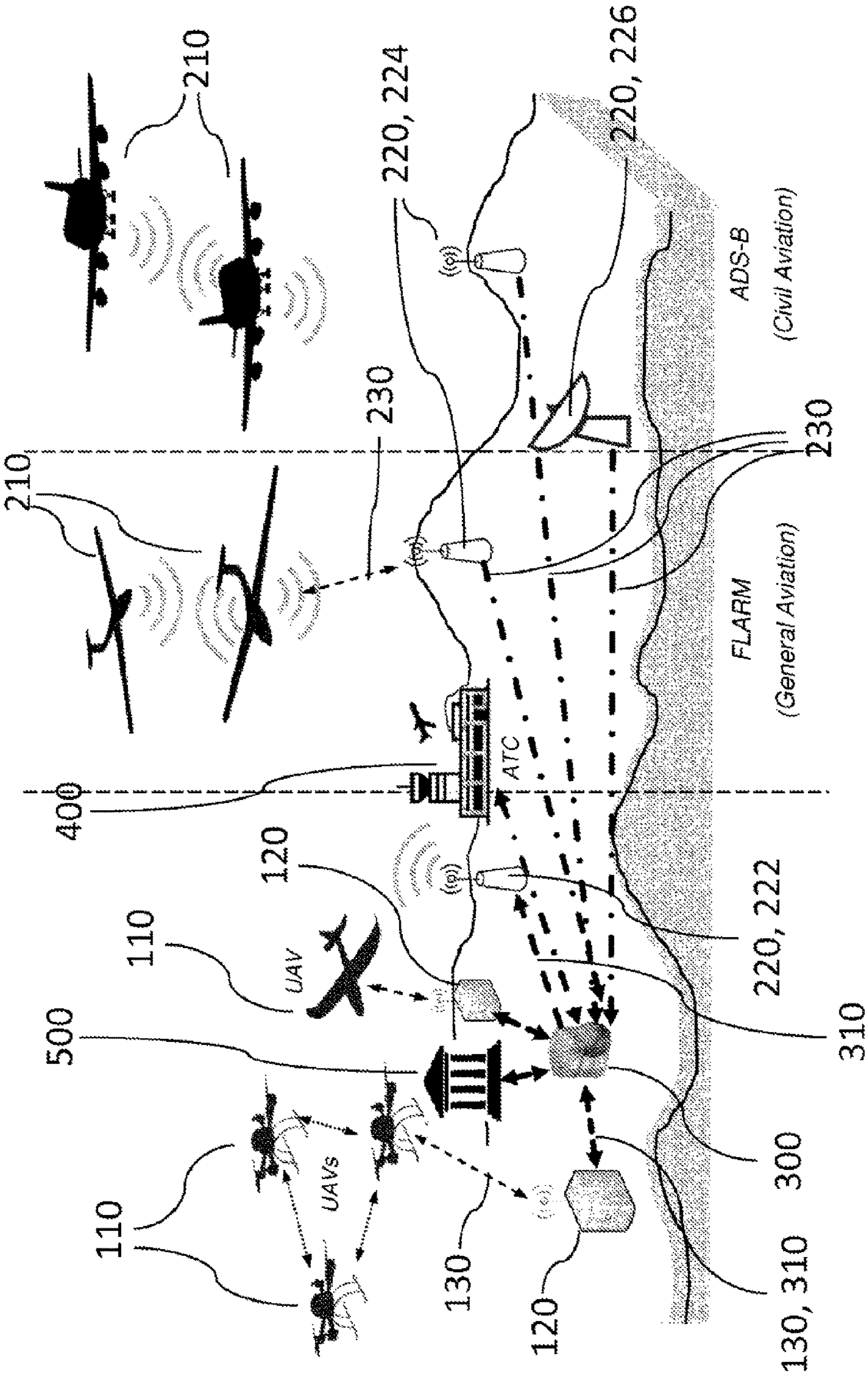
FIG. 5 is a schematic illustration of the method for airspace monitoring with a plurality of first aircraft and second aircraft, in accordance with the preferred exemplary embodiment of the invention.

FIG. 5 shows a method for monitoring airspace, having a plurality of first aircraft 110 and a plurality of second aircraft 210. In the present case, the first aircraft 110 are unmanned aircraft and the second aircraft 210 are manned aircraft.

The unmanned aircraft are connected to the first control and detection unit 120, which is in the form of a ground station, such that they can communicate. The ground station is, in turn, connected to the air monitoring system 300 such that they can communicate.

Furthermore, the air monitoring system 300 is connected to the second control and detection unit 220 such that they can communicate, wherein the second control and detection unit 220 is in the form of a secondary radar transmitter 222 and secondary radar receiver 224 or in the form of a radar tracking system 226.

First data 130 of the respective unmanned aircraft are transmitted to the air monitoring system 300 by means of the ground station. Second data 230 of the respective manned aircraft are received by means of the secondary radar receiver 224 and/or by means of the radar tracking system 226 and sent to the air monitoring system 300, wherein the second data 230 are transmitted in the FLARM and/or ADS-B format.

The first data 130 and second data 230 are transformed, stored and checked for a collision in the airspace monitoring system 300. Based on this collision check, data 310 is transmitted to the unmanned aircraft by means of the ground station and to the manned aircraft, preferably in the FLARM and/or ADS-B format, by means of the secondary radar transmitter 222.

If a risk of collision has been spotted, the data 310, in particular the flight data of the unmanned aircraft, is changed in such a way that the flight route of said unmanned aircraft is changed in order to prevent the identified risk of collision.

The airspace monitoring system 300 is additionally connected to an air traffic control center 400 such that they can communicate, in order to transmit the data 310 to the air traffic control center 400. In this way, the airspace can additionally be monitored by means of the air traffic control center 400.

The airspace monitoring system 300 is additionally connected to an authorizing body 500 for authorizing ascent permissions and/or flight routes. In this way, ascent permission can be applied for and obtained before a flight based on the first data 130, in particular data of a planned flight route, for the unmanned aircraft by means of the airspace monitoring system 300. The first data 130 of the unmanned aircraft, in particular data of the planned flight route, is checked for any overlaps or conflicts with no-fly zones within the airspace monitoring system 300. In addition, a check is made in respect of compliance with regulatory conditions. If all requirements are met, ascent permission is requested and/or granted by the airspace monitoring system 300.

Figure 6:
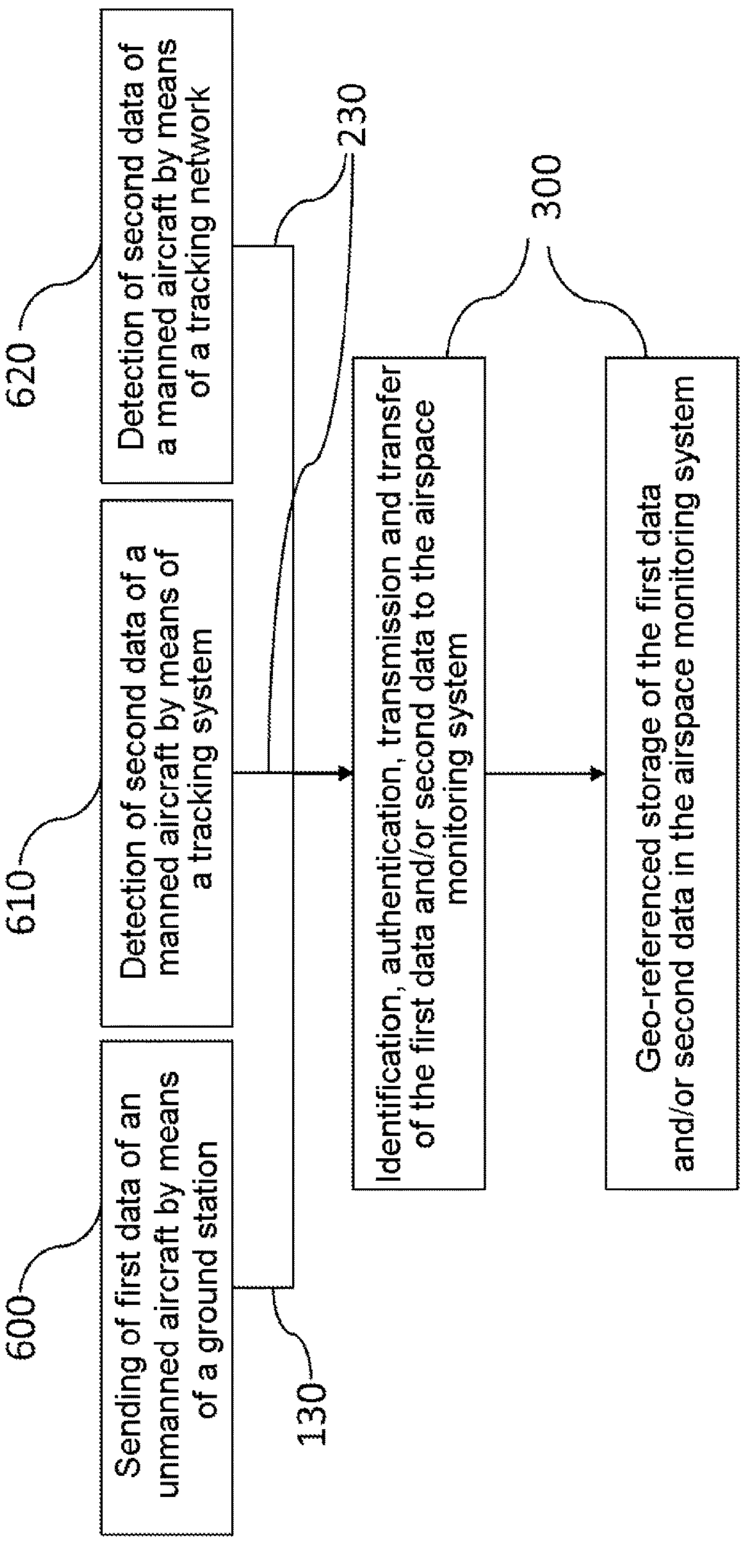
FIG. 6 shows a method sequence for detecting first data and second data in the airspace monitoring system, in accordance with the preferred exemplary embodiment of the invention.

FIG. 6 shows a method for the detection of first data 130 and second data 230 by the airspace monitoring system 300.

In a first method 600, the first data 130 of the first aircraft, wherein the first aircraft is an unmanned aircraft, is transmitted to the airspace monitoring system 300 by means of the first control and detection unit which is in the form of a ground station.

In a second method 610, the second data 230 of the second aircraft, wherein the second aircraft is a manned aircraft, is detected by a tracking system, preferably by a secondary radar receiver or an ADS-B receiver, and transmitted to the airspace monitoring system 300.

A third method 620 provides that the second data of a manned aircraft is detected by a tracking network, preferably by an open glider network, and transmitted to the airspace monitoring system 300. The open glider network preferably serves to detect second data of second aircraft which are equipped with FLARM, such as, preferably, paragliders, relatively small airplanes or helicopters.

The first data 130 which is transmitted to the airspace monitoring system by means of the first method 600 and the second data 230 which is transmitted to the airspace monitoring system by means of the second method 610 and/or third method 620 is identified in accordance with the respective aircraft in the airspace monitoring system, if necessary transformed, and stored in the airspace monitoring system 300. In addition, the first data 130, which is in the form of flight data, and the second data 230, which is in the form of flight data, is checked for a collision. In this way, a possible collision between a first aircraft and a second aircraft can be identified on the basis of the flight data in the airspace monitoring system 300.

Figure 7:
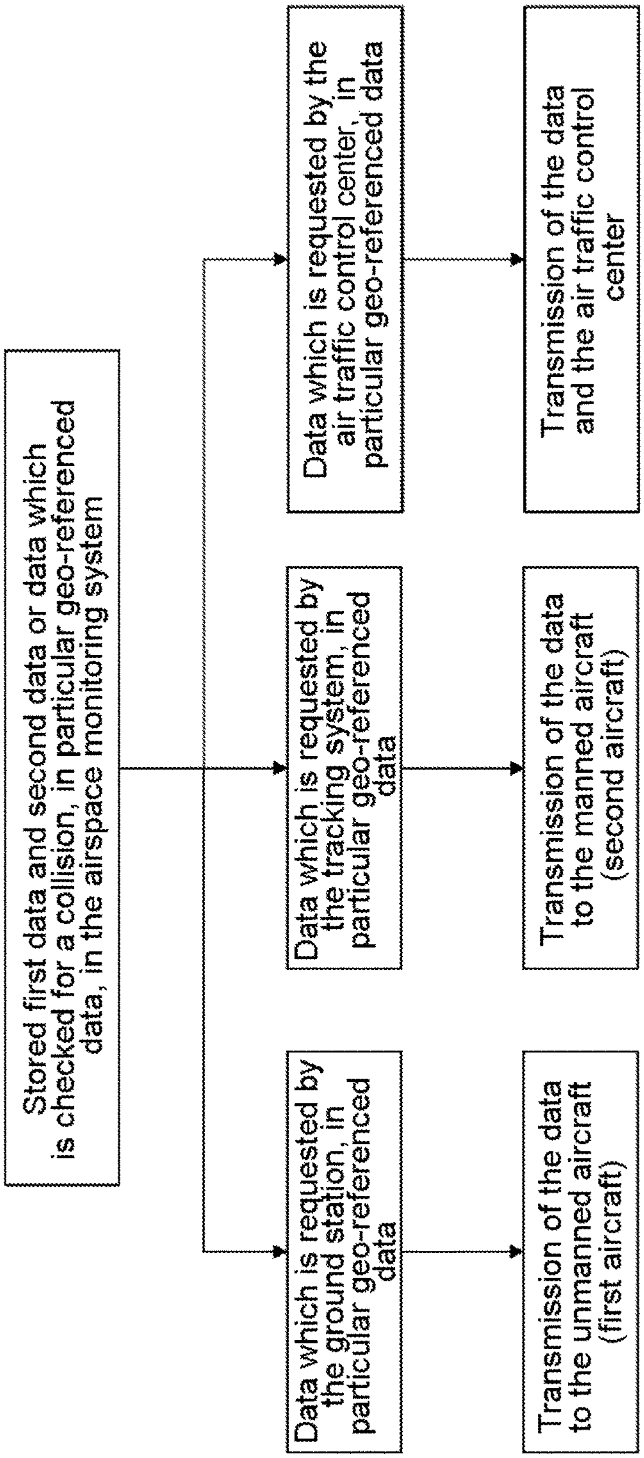
FIG. 7 shows a method sequence for sending data from the airspace monitoring system, in accordance with the preferred exemplary embodiment of the invention.

A method for distributing the data which is stored in the airspace monitoring system and is based on the first data and the second data is shown in FIG. 7. According to said figure, the data which is stored in the airspace monitoring system and checked for the risk of a collision is transmitted to the first control and detection unit, which is in the form of a ground station, and sent to the unmanned aircraft, which is connected to the ground station such that they can communicate, by means of the ground station. In the event of a risk of the unmanned aircraft colliding with another unmanned or manned aircraft being identified, the data which is sent by the airspace monitoring system can contain information relating to a changed flight route, in order to prevent a collision in this way. Therefore, a new flight route is calculated by means of the airspace monitoring system, so that corresponding technology on board the unmanned aircraft is not required.

A further method provides that the data of the airspace monitoring system is transmitted to the second control and detection unit, which is in the form of a tracking system, and is forwarded to the manned aircraft by means of ADS-B and/or FLARM. Therefore, the manned aircraft are informed about the unmanned aircraft located in the airspace. Moreover, the data which is addressed to the manned aircraft can also contain information relating to a changed flight route, so that precautions for preventing a collision or a risk of collision can be taken in the manned aircraft.

In addition, a further method provides that, for control purposes, the data which is stored in the airspace monitoring system is transmitted to the air traffic control center for further use and control of said data.

Figure 8:
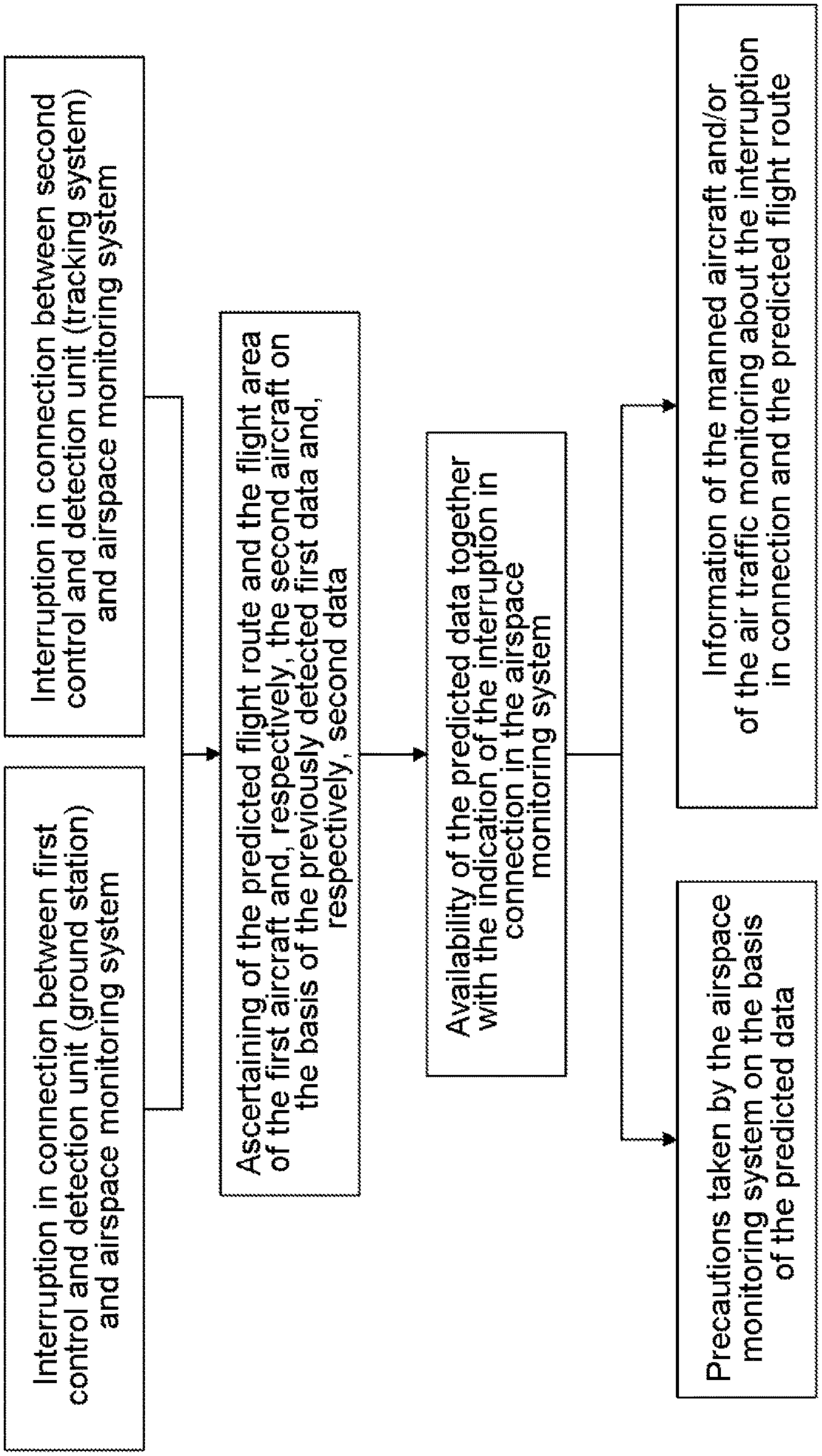
FIG. 8 shows a method for distributing data of the airspace monitoring system in the event of an unplanned interruption in connection between the first control and detection unit or the second control and detection unit and the airspace monitoring system, in accordance with the preferred exemplary embodiment of the invention.

FIG. 8 shows a method for distributing data of the airspace monitoring system in the event of an unplanned interruption in connection between a first control and detection unit, which is in the form of a ground station, and the airspace monitoring system or an unplanned interruption in connection between a second control and detection unit, which is in the form of a tracking system, and the airspace monitoring system.

If there is an interruption in connection between the airspace monitoring system and the ground station, wherein the ground station is connected to an unmanned aircraft (first aircraft), the expected flight route for the unmanned aircraft is ascertained or predicted in the airspace monitoring system based on the first data which was detected last. This data is provided in the airspace monitoring system together with the indication of the interruption in connection and sent to the manned aircraft by means of the second control and detection unit, so that said manned aircraft is made aware of the situation and can take any precautionary measures, such as, preferably, a changed flight route. In addition, this data is transmitted to the air traffic monitoring, so that the airspace can be monitored more closely.

Figure 9:
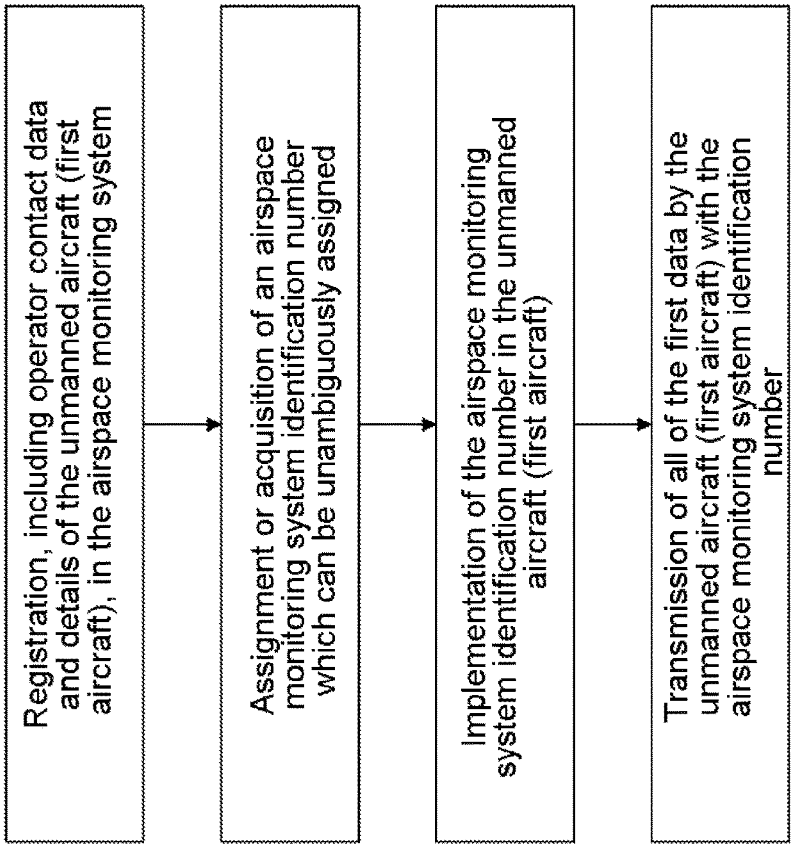
FIG. 9 shows a method for registering, identifying and authenticating a first aircraft using the airspace monitoring system, in accordance with the preferred exemplary embodiment of the invention.

FIG. 9 describes a method for registering, identifying and authenticating an unmanned aircraft (first aircraft) in the airspace monitoring system.

In a first step, the operator of the unmanned aircraft is registered in the airspace monitoring system.

Upon registration in the airspace monitoring system, the operator and the unmanned aircraft are provided, in a second step, with an airspace monitoring system identification number which can be unambiguously assigned. In this way, the unmanned aircraft can be unambiguously identified by the airspace monitoring system and the operator can be legally securely assigned. First data of the unmanned aircraft, which first data is received by the airspace monitoring system, can therefore be unambiguously assigned to the unmanned aircraft and to the operator. The airspace monitoring system identification number is preferably a machine readable identifier in the form of a QR code.

In a third step, the airspace monitoring system identification number is implemented in the unmanned aircraft, preferably on a SIM card or a chip card. The airspace monitoring system identification number is associated with the unmanned aircraft in this way.

All of the first data which is sent by the unmanned aircraft contains the airspace monitoring system identification number. In addition, the sent first data is digitally signed, so that the first data is introduced into the airspace monitoring system in a personal or device-related manner.

Figure 10:
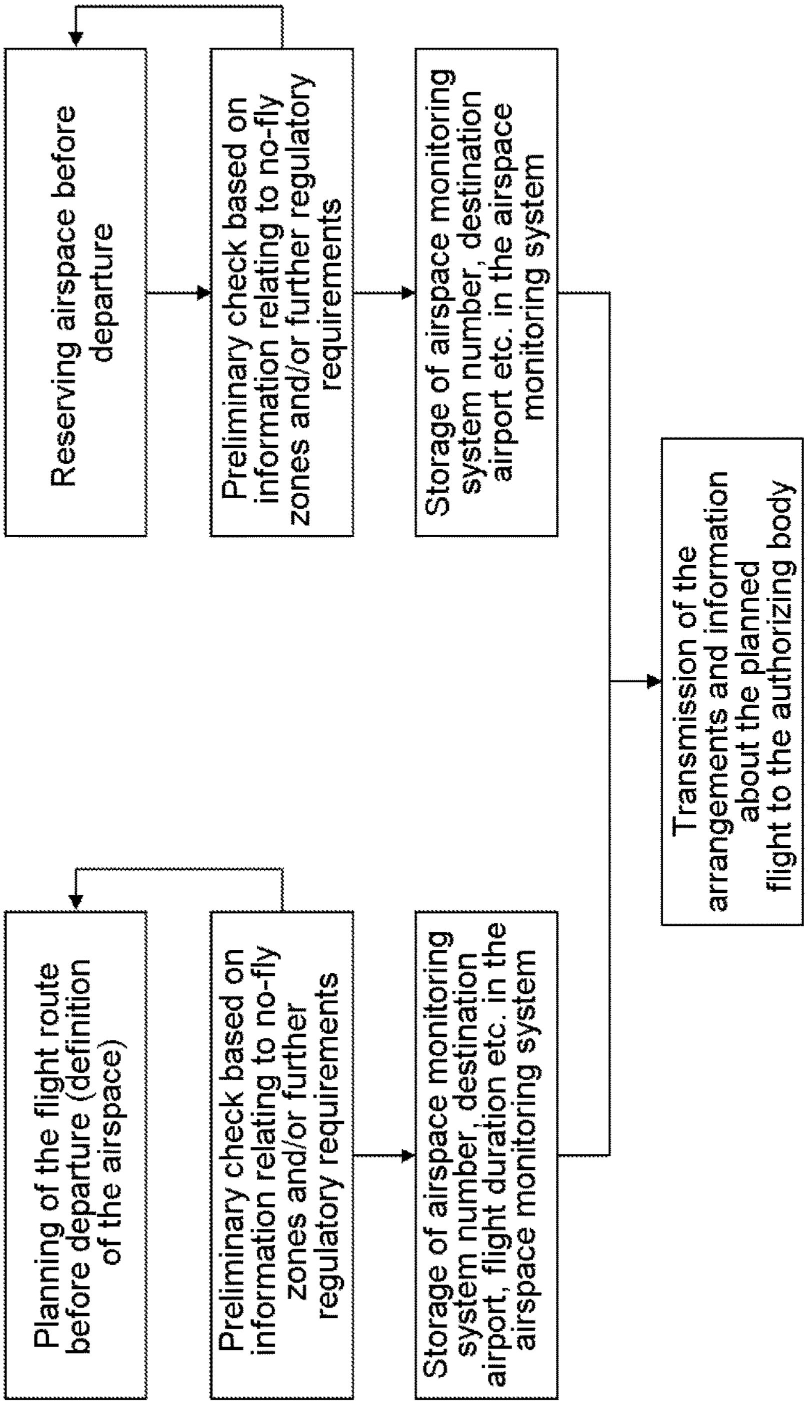
FIG. 10 shows a method for reserving a flight area, in accordance with the preferred exemplary embodiment of the invention.

FIG. 10 shows a method for reserving a flight area or airspace, wherein the method comprises two methods. The first method exhibits a method for planning the flight route and defining the airspace in advance of departure, and the second method shows the method for reserving airspace immediately before departure.

The method relates to first aircraft which are in the form of unmanned aircraft. In addition, data of fundamental or temporary no-fly zones are stored in the airspace monitoring system or can be called up by means of the airspace monitoring system being connected to an authorizing body such that they can communicate. Moreover, data for complying with particular regulatory conditions is stored in the airspace monitoring system or can be called up by means of the authorizing body.

In the first method, sequence diagram on the left-hand side, the planned flight route for an unmanned aircraft is transmitted in the form of first data to the airspace monitoring system. In the airspace monitoring system, a preliminary check of the first data is carried out in respect of the data which is stored in the airspace monitoring system or can be called up by means of the airspace monitoring system for any no-fly zones or further regulatory requirements, such as, preferably, a distance which has to be maintained from certain areas or cities.

If the planned flight route of the unmanned aircraft meets all of the requirements, the airspace monitoring system identification number of the unmanned aircraft, type of the unmanned aircraft, departure and destination airport, flight route, duration of the planned flight and departure time and departure date are stored in the airspace monitoring system.

The stored data about the planned flight of the unmanned aircraft is transmitted to the authorizing body.

The method for reserving airspace before departure, sequence diagram on the right-hand side, proceeds substantially analogously to the above-described first method which describes the planning of the flight route before departure.

Figure 11:
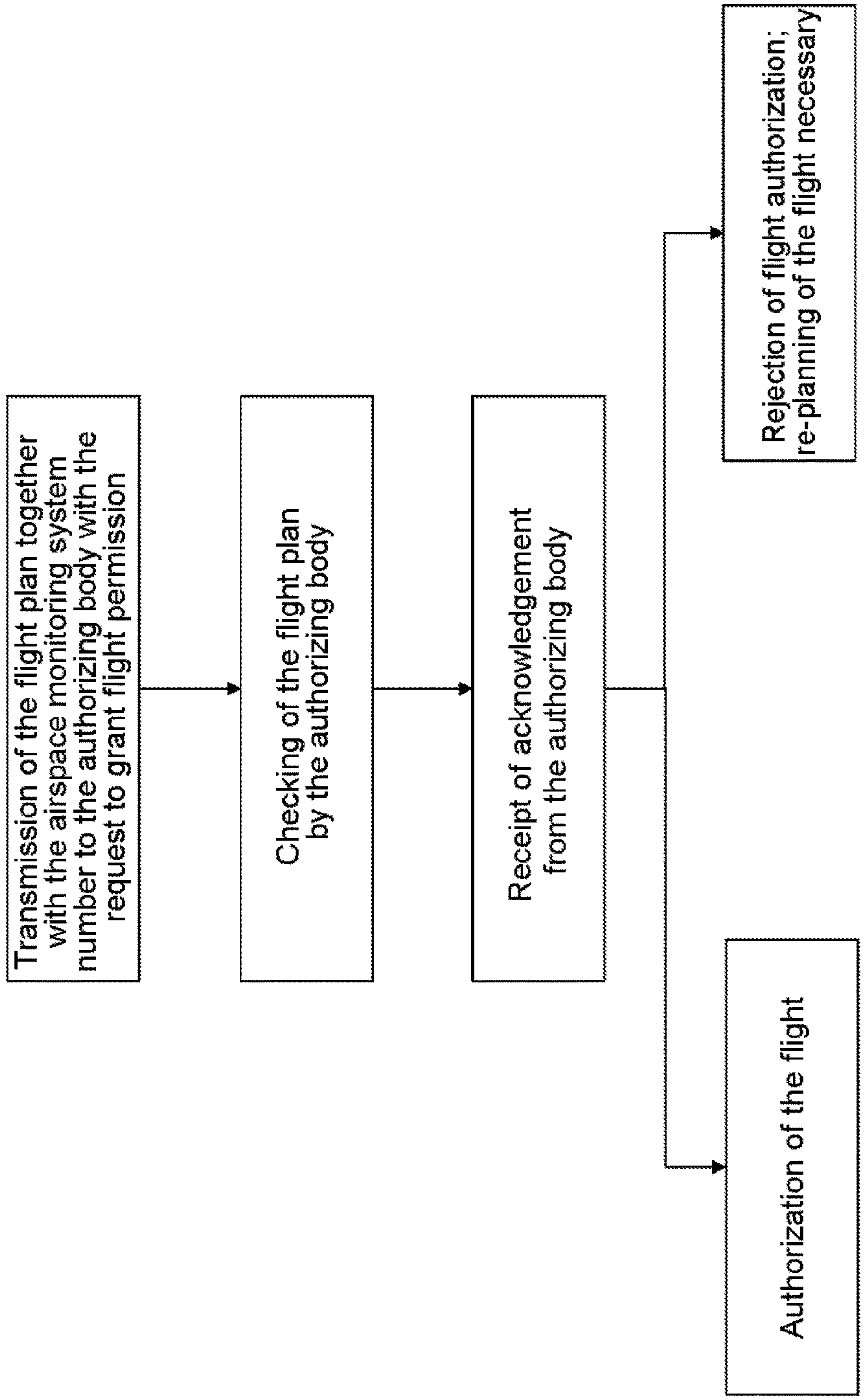
FIG. 11 shows a method for obtaining flight clearance from an authorizing body, in accordance with the preferred exemplary embodiment of the invention.

The request for flight permission for the planned flight made to the authorizing body is shown in FIG. 11. The first data of the planned flight of the unmanned aircraft (first aircraft) is transmitted together with the airspace monitoring system identification number to the authorizing body with the request to grant flight permission.

The authorizing body checks the flight plan and issues acknowledgement in the form of a reply. The reply can be authorization of the flight or else rejection of flight authorization. If the authorizing body rejects the flight, the flight has to be re-planned.

LIST OF REFERENCE SYMBOLS

100 First control and monitoring system
110 First aircraft
120 First control and detection unit
130 First data
140 Machine-readable identifier
150 Two-dimensional barcode
160 Alphanumeric component
200 Second control and monitoring system
210 Second aircraft
220 Second control and detection unit
222 Secondary radar transmitter
224 Secondary radar receiver
226 Radar tracking system
230 Second data
300 Airspace monitoring system
310 Data
400 Air traffic control center
500 Authorizing body

The invention claimed is:

1. A method for monitoring airspace, having a first control and detection system (100) and a second control and detection system (200), wherein the first control and detection system (100) has a first aircraft (110) and a first control and detection unit (120), and the second control and detection system (200) has a second aircraft (210) and a second control and detection unit (220), an airspace monitoring system (300) which is different from the first control and detection unit (120) and also from the second control and detection unit (220) is provided, first data (130) relating to the first aircraft (110) is transmitted to the airspace monitoring system (300) by the first control and detection unit (120), and data (310) which is based on the first data (130) is sent to the second control and detection unit (220) by the airspace monitoring system (300), the data (310) is transmitted to the second aircraft (210) by the second control and detection unit (220), the first data (130) which is transmitted to the airspace monitoring system (300) are the data (310) which is sent to the second control and detection unit by the airspace monitoring system (300) are digitally signed, and based on the first data (130), a region of the airspace on the flight route of the first aircraft (110) in the airspace monitoring system (300) is reserved for the first aircraft (110) for a period of time, and/or based on the first data (130) for the first aircraft (110), ascent permission for the first aircraft (110) is applied for and received by means of the airspace monitoring system (300).

2. The method as claimed in claim 1, characterized in that the first data (130) which is transmitted to the airspace monitoring system (300) and/or the data (310) which is sent to the second control and detection unit (220) by the airspace monitoring system (300) is transformed in the airspace monitoring system (300).

3. The method as claimed in claim 1, characterized in that the first data (130) which is transmitted to the airspace monitoring system (300) and/or the data (310) which is sent to the second control and detection unit (220) by the airspace monitoring system (300) is stored in the airspace monitoring system (300).

4. The method as claimed in claim 1, characterized in that the first aircraft (110) is identified by the airspace monitoring system (300).

5. The method as claimed in claim 1, characterized in that the first data (130) which is transmitted to the airspace monitoring system (300) and/or the data (310) which is sent to the second control and detection unit (220) by the airspace monitoring system (300) is encrypted.

6. The method as claimed in claim 1, characterized in that the first aircraft (110) is an unmanned aircraft and the unmanned aircraft has a continuous connection to the first control and detection unit (120) and, when the continuous connection is interrupted, first data (130) relating to the interruption in connection is transmitted to the airspace monitoring system (300) by the first control and detection unit (120), and data (310) is sent to the second control and detection system (220) by the airspace monitoring system (300) based on the first data (130) relating to the interruption in connection.

7. The method as claimed in claim 1, characterized in that second data (230) relating to the second aircraft (210) is transmitted to the airspace monitoring system (300) by the second control and detection unit (220).

8. The method as claimed in claim 7, characterized in that data (310), which is based on the second data (230), is sent to the first control and detection unit (120) by the airspace monitoring system (300).

* * * * *